Patented Sept. 20, 1932

1,878,969

UNITED STATES PATENT OFFICE

LINDLEY E. MILLS, OF MIDLAND, MICHIGAN, ASSIGNOR TO THE DOW CHEMICAL COMPANY, OF MIDLAND, MICHIGAN, A CORPORATION OF MICHIGAN

ACYLATING AMINE

No Drawing. Application filed May 20, 1929. Serial No. 364,696.

The present invention is concerned with the acylation of amines by means of an organic acid, more particularly with the methods involving the acylation of aromatic amines using an aliphatic acid, and still more particularly with the acetylation of aniline by means of acetic acid. It is among the objects of the invention to provide a method which is efficient and reliable and which assures the preparation of a salable product after only one crystallization. By a salable product I mean one that is sufficiently white and pure to satisfy the demands of the trade. Other objects and advantages will appear as the description proceeds.

Amines are usually acylated by treatment with one of the three following reagents: an organic acid, an acid chloride or an acid anhydride. In the preparation of acetanilide, for instance, from acetic acid and aniline it is necessary for the purification of the product to recrystallize the crude product several times from a solvent such as alcohol, the colored impurities being removed by means of a suitable decolorizing material, e.g. a charcoal. Such operations are necessary since a dark grey colored crude product is usually obtained by the aforementioned acylation procedure, from which it is extremely difficult to prepare a product sufficiently white and pure to satisfy the demands of the trade. A method for the production of acetanilide from its simple components, namely aniline and acetic acid, without necessitating extensive and costly purification is highly desirable.

I have now found that this same general method of acylation may be applied for the preparation of acylated aromatic amines, such as acetanilide or acetphenetidine, in a substantially pure and white form without necessity for an elaborate or extensive purification procedure if the reaction is operated under essentially non-oxidizing conditions. The invention, then, consists of the procedure hereinafter fully described and particularly pointed out in the claims, the following description setting forth but a few of the various ways in which the principle of the invention may be used.

The present invention consists essentially in establishing the three following conditions for the reaction: (1) maintenance of an atmosphere of inert gas, such as carbon dioxide or hydrogen, in the apparatus during the procedure; (2) addition of the acid to the amine after the latter has been heated to approximately the temperature at which the mixture of amine and acid will begin to boil, and maintenance of this temperature during the addition of the acid; and (3) conducting the reaction in the presence of a metal, preferably aluminum, which in conjunction with the acid, has a reducing action. The first condition may be accomplished by passing the aforementioned inert gas continuously through the apparatus until all air is displaced and preventing the entrance of air by means of a suitable check valve or other arrangement. Exclusion of air prevents atmospheric surface oxidation. The second aforementioned condition has been found to assist materially in preventing the formation of colored by-products. The amine is heated to the desired temperature in the substantial absence of air previously to the gradual addition of the acid. The third condition has been found advantageous to supplement the two first named. Other metals may replace aluminum, e. g. zinc or magnesium; such metals exert a reducing action by evolution of hydrogen from the acid employed, but do not form colored compounds with the reaction components. I am aware that aluminum has been used as a structural material in the construction of apparatus for handling organic acids such as acetic acid. Hence this fact may be used to advantage in carrying out the invention, in conjunction with the first two of the three aforementioned conditions. However, it is unnecessary to use aluminum apparatus; the apparatus may be enamelled or glass-lined. In such case, the metal as aluminum, e. g. in strips or pieces, may be put into the reactor vessel.

The reactions involved in the present method of amine acylations may be represented in the following manner:

1. $RNH_2 + R'COOH \rightarrow RNHCOR' + H_2O$
2. $C_6H_5NH_2 + CH_3COOH \rightarrow C_6H_5NHCOCH_3 + H_2O$

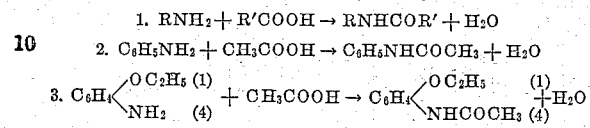

(where R is an organic residue, preferably aromatic; and R' is an organic residue, preferably aliphatic). The first reaction is general, illustrating the types of compounds concerned. The second reaction specifically involves the acetylation of aniline by means of acetic acid, the products being acetanilide and water. The third reaction indicates a similar acetylation of para-phenetidine with the production of acetphenetidine.

The following detailed examples illustrate but a few of the various ways in which my invention may be carried out, but I do not limit myself to the procedure mentioned therein. Example 1:

In a glass vessel containing pieces of aluminum metal, provided with a fractionating column and condenser, was placed 157.5 grams of freshly distilled aniline. Hydrogen was passed through the apparatus until all air was removed and the aniline then heated to approximately 130° C. Into the hot aniline was then run 187 grams glacial acetic acid at such a rate that the temperature of the reaction mixture did not fall below about 115° C. The distillate was refluxed and the water formed in the reaction was fractionally distilled off. After the conjoint operations of heating, refluxing and water-fractionation had continued during a period of about seven hours, the temperature reached approximately 185° C. The supply of hydrogen was turned off and the reaction mixture poured into about 600 cc. water. The acetanilide crystals thereby formed were filtered, washed with water and dried. The yield was 217 grams or 95 per cent. of the theoretical amount. The product after one recrystallization from alcohol was substantially pure and white. Example 2:

In a suitable aluminum vessel provided with a fractionating column and condenser was placed 1370 grams of freshly distilled para-phenetidine. Carbon dioxide was passed through the apparatus and when all the air had been displaced, the para-phenetidine was heated to approximately 125-160° C. Then 960 grams of glacial acetic acid was run in at such a rate that the temperature of the reaction mixture did not fall below about 125° C. As in example 1, the contents of the vessel were heated, the acetic acid refluxed and the water formed was distilled off. After the temperature of the reaction mixture had risen to about 160-165° C., which required from 2.5 to 4 hours, it was held at that point for 1.5 hours longer to complete the reaction and remove substantially all the water. The flow of carbon dioxide was then discontinued and the mixture poured into 4 liters of water, after which the crystals of acetphenetidine thereby formed were filtered, washed with water and dried. The yield was about 90 per cent. of the theoretical amount.

In an acylation of the nature described, as is commonly known, the speed of the reaction diminishes as the product accumulates. Hence the reaction time may be shortened and the yield somewhat increased by the addition of a comparatively small amount of the corresponding acid anhydride to the reaction mixture, but this is not necessary for carrying out the invention.

An inert or reducing atmosphere for the reaction may be maintained either by continuous passage of a suitable gas through the apparatus or merely by initially displacing the air in the apparatus. In the first case, after the air has been replaced by the inert gas, the flow of the latter is cut down to a minimum, i. e. to a point just sufficient to prevent the entrance of air. In the second case, it is necessary to use some suitable means of preventing air from re-entering the apparatus, e. g. a check valve.

Temperature control is very important for the preparation of a white product, especially with an amine such as a phenetidine which is susceptible to decomposition and discoloration. In the preparation of acetanilide, for instance, as in Example 1, the product is discolored if the temperature of the reaction mixture falls much below 110° C. during the addition of acetic acid to the hot aniline. Obviously the same heat relationships may be obtained in other ways, for instance by adding acetic acid to aniline when both are maintained at about the same temperature, i. e. approximately 110-115° C., or by adding acetic acid at a higher temperature to aniline at a lower temperature such that the temperature of the resulting mixture is about 110-115° C. throughout the addition of the acid. Hence, the temperature to which aniline is heated initially may be varied somewhat from the figure of 130° C. given in Example 1, depending on the temperature and rate of addition of the acetic acid. As the reaction between aniline and acid proceeds, substantially all the water formed is fractionally distilled off, hence the amount of original components decreases as the acetanilide forms, and the boiling point of the reaction mixture rises to approximately 185° C. at the end of the reaction. Although glacial acetic acid was mentioned in the examples, an equivalent amount of an aqueous acetic acid may likewise be used. In such event, water initially present in the acid distills off as the reaction proceeds, in the same manner as that formed in the reaction. An excess of acetic acid is advantageous, the latter functioning in several ways, (1) as solvent, (2) to increase the rate of reaction by mass action, (3) to drive the reaction towards completion, (4) to hold any unreacted aniline in solution when the reaction product is put into water, and (5) to replace a small amount of acetic acid lost by distilling out with the water during the reaction.

It is immaterial as far as the purity of product is concerned whether the apparatus is constructed of aluminum or of some other suitable material, e. g. glass or enamel lined apparatus, provided that in the latter case pieces or strips of aluminum, zinc or other suitable metal are present. While I prefer aluminum, other metals which will withstand the corrosive action of acetic acid sufficiently and yet produce a reducing action in conjunction with the acid, may be used, as aforementioned.

Other compounds of the present character may be reacted in accordance with my invention which applies generally to amines and organic acids and more specifically to aromatic amines and aliphatic acids. The amines mentioned in the examples, i. e. aniline and para-phenetidine, may be replaced by related compounds which are not substituted by groups or residues that would interfere in the reaction or be themselves thereby changed. Examples of such compounds are nuclear mono-alkylated amines, e. g. the toluidines, and the mono-halogenated aromatic amines, e. g. mono-chlorinated anilines or toluidines. Likewise, the acid reaction component may be varied, e. g. acetic acid may be replaced by homologous aliphatic acids, such as propionic acid, butyric acid or substituted derivatives thereof.

The ratio of components, as given in the examples, may be altered somewhat without going outside the bounds of the invention, so long as sufficient acid is present at the end of the reaction to convert the amine completely to the acylated product or at least to change any unreacted amine into a water-soluble salt thereof.

In short, it may be stated that the essentials of this invention for the acylation of an amine by means of an acid are (1) maintenance of an inert or reducing atmosphere during the procedure, (2) addition of acid to the amine heated to and maintained at a suitable reaction temperature, and (3) carrying out the reaction in the presence of a metal which in conjunction with the acid exerts a reducing action.

The remarks and temperatures as given above apply more particularly to the examples given, but the principles hold true when other amines and acids are considered. Acylations other than given in the examples, may be performed at either higher or lower temperatures, depending on the particular components employed.

It is to be emphasized that a particular advantage of my invention is that a product is obtained of such color that one cystallization suffices to produce a U. S. P. product, or the equivalent.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of making acetphenetidine which comprises heating para-phenetidine to 125–160° C., and adding acetic acid, such steps being carried out in the substantial absence of air and in the presence of at least one metal from the group consisting of aluminum, zinc, and magnesium, while maintaining the reaction mixture at a temperature above 110° C.

2. The method of making acetphenetidine which comprises heating para-phenetidine to 125–160° C., gradually adding acetic acid thereto, and maintaining the temperature of the mixture above 120° C., the heating being carried out in the substantial absence of air and in the presence of at least one metal from the group consisting of aluminum, zinc, and magnesium.

3. A method of making acetphenetidine, which comprises heating para-phenetidine to 125–160° C., in a vessel provided with fractionation and refluxing means after having displaced air therefrom by a gas inert in the following reaction step, adding acetic acid thereto gradually in controlled amount to maintain an excess of phenetidine in the reaction mixture while maintaining the temperature of the said mixture above 120° C.

4. The method of making an N-acyl aromatic amine which comprises heating an aromatic amine, having an acylable hydrogen attached to the nitrogen, to approximately its boiling point and adding thereto an aliphatic carboxylic acid during the course of the ensuing reaction, such operations being conducted under substantially non-oxidizing conditions while maintaining the reaction mixture at a temperature above 110° C.

5. The method of making an N-acetyl aromatic amine which comprises heating an aromatic amine having an acylable hydrogen attached to the nitrogen, and gradually adding thereto acetic acid during the course of the ensuing reaction, such operations being conducted under substantially non-oxidizing conditions while maintaining the reaction mixture at a temperature above 110° C.

6. The method of making acetphenetidine which comprises heating phenetidine to 125° to 160° C., and gradually adding acetic acid thereto during the course of the ensuing reaction, such operations being conducted under substantially non-oxidizing conditions while maintaining the reaction mixture at a temperature above 110° C.

7. The method of making an N-acyl aromatic amine which comprises heating an aromatic amine, having an acylable hydrogen attached to the nitrogen, to approximately its boiling point and adding an aliphatic carboxylic acid during the course of the ensuing reaction, such steps being carried out in the substantial absence of air, at a temperature above 110° C. and in the presence of at least one metal from the group consisting of aluminum, zinc, and magnesium.

8. The method of making an N-acetyl aromatic amine which comprises heating an aromatic amine, having an acylable hydrogen attached to the nitrogen, to approximately its boiling point, and adding acetic acid thereto during the course of the ensuing reaction, such steps being carried out in the substantial absence of air, at a temperature above 110° C. and in the presence of at least one metal from the group consisting of aluminum, zinc, and magnesium.

9. The method of making an N-acyl aromatic amine which comprises heating an aromatic amine, having an acylable hydrogen attached to the nitrogen, to approximately its boiling point, gradually adding an aliphatic carboxylic acid thereto during the course of the ensuing reaction, and maintaining the temperature of the mixture approximately at the boiling point thereof, the heating being carried out in the substantially absence of air and in the presence of at least one metal from the group consisting of aluminum, zinc, and magnesium.

10. The method of making an N-acetyl aromatic amine which comprises heating an aromatic amine, having an acylable hydrogen attached to the nitrogen, to approximately its boiling point, gradually adding acetic acid thereto during the course of the ensuing reaction, and maintaining the temperature of the reaction mixture at the boiling point thereof, such steps being carried out in the substantial absence of air and in the presence of at least one metal from the group consisting of aluminum, zinc, and magnesium.

11. The method of making acetphenetidine which comprises heating para-phenetidine to 125° to 160° C., gradually adding acetic acid thereto during the course of the ensuing reaction, maintaining the temperature of the reaction mixture above 120° C., and distilling water therefrom substantially as formed, such steps being carried out in the substantial absence of air and in the presence of at least one metal from the group consisting of aluminum, zinc, and magnesium.

12. In a method of making an N-acyl aromatic amine, the steps of gradually adding an aliphatic carboxylic acid to an aromatic amine having an acylable hydrogen attached to the nitrogen, maintaining the reaction mixture approximately at its boiling point during the addition of the acid, and maintaining an atmosphere of a non-oxidizing inert gas, while conducting the reaction in the presence of a metal which in conjunction with the added acid has a reducing action.

13. In a method of making an N-acetyl aromatic amine, the steps of adding acetic acid to an aromatic amine having an acylable hydrogen attached to the nitrogen, maintaining the reaction mixture at a temperature whereby water formed therein will distill therefrom, during the addition of the acid, maintaining an atmosphere of a non-oxidizing inert gas, while conducting the reaction in the presence of a metal which in conjunction with the added acid has a reducing action.

14. The method of making acetanilide which comprises heating aniline to 110° to 130° C., and gradually adding acetic acid thereto during the ensuing reaction, such operations being conducted under substantially non-oxidizing conditions while maintaining the reaction mixture at a temperature above 110° C.

15. The method of making acetanilide which comprises heating aniline to 110° to 130° C., gradually adding acetic acid thereto during the course of the ensuing reaction, maintaining the reaction mixture above 110° C., and distilling water therefrom substantially as formed, such steps being carried out in the practical absence of air and in the presence of at least one metal from the group consisting of aluminum, zinc, and magnesium.

16. In a method of making acetanilide, the steps of heating aniline to 110° to 130° C. in a vessel provided with fractionation and refluxing means after having displaced air therefrom by a gas relatively inert in the following reaction step, gradually adding acetic acid in controlled amount thereto and maintaining the temperature of the said mixture above 110° C.

Signed by me this 16th day of May, 1929.

LINDLEY E. MILLS.